(12) United States Patent
Archer et al.

(10) Patent No.: US 7,895,260 B2
(45) Date of Patent: Feb. 22, 2011

(54) PROCESSING DATA ACCESS REQUESTS AMONG A PLURALITY OF COMPUTE NODES

(75) Inventors: Charles J. Archer, Rochester, MN (US); Emily J. Howe, Sunnyvale, CA (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/180,963

(22) Filed: Jul. 28, 2008

(65) Prior Publication Data

US 2010/0023631 A1   Jan. 28, 2010

(51) Int. Cl.
G06F 15/173 (2006.01)
(52) U.S. Cl. ..................................... 709/201
(58) Field of Classification Search ................. 709/201, 709/208, 213, 218
See application file for complete search history.

(56) References Cited

U.S. PATENT DOCUMENTS

| | | | |
|---|---|---|---|
| 4,860,201 A | 8/1989 | Stolfo et al. | |
| 4,910,669 A | 3/1990 | Gorin et al. | |
| 5,651,099 A | 7/1997 | Konsella | |
| 5,815,793 A * | 9/1998 | Ferguson | 725/131 |
| 5,826,262 A | 10/1998 | Bui et al. | |
| 5,826,265 A | 10/1998 | Van Huben et al. | |
| 5,875,190 A | 2/1999 | Law | |
| 6,006,032 A | 12/1999 | Blandy et al. | |
| 6,047,122 A | 4/2000 | Spiller | |
| 6,101,495 A | 8/2000 | Tsuchida et al. | |
| 6,493,637 B1 | 12/2002 | Steeg | |
| 6,633,937 B2 | 10/2003 | Thomson | |
| 6,653,823 B1 | 11/2003 | Przygienda et al. | |
| 6,836,480 B2 | 12/2004 | Basso et al. | |
| 6,952,692 B1 | 10/2005 | Bhattiprolu et al. | |
| 7,197,577 B2 | 3/2007 | Nellitheertha | |
| 7,216,217 B2 | 5/2007 | Hansen et al. | |
| 7,301,541 B2 | 11/2007 | Hansen et al. | |
| 7,673,011 B2 | 3/2010 | Archer et al. | |

(Continued)

OTHER PUBLICATIONS

Bershad et al. SPIN—An Extensible Microkernel for Application-Specific Operating System Services. ACM SIGOPS Operating System Review. volume 29, Issue 1 (Jan. 1995). pp: 74-77.

(Continued)

*Primary Examiner*—David Y Eng
(74) *Attorney, Agent, or Firm*—Biggers & Ohanian, LLP

(57) ABSTRACT

Methods, apparatus, and products are disclosed for processing data access requests among a plurality of compute nodes. One compute node operates as a processing node, and one compute nodes operates as a requesting node. The processing node receives, from the requesting node, a data access request to access data currently being processed by the processing node. The processing node also receives, from the requesting node, a processing directive. The processing directive specifies data processing operations to be performed on the data specified by the data access request. The processing node performs, on behalf of the requesting node, the data processing operations specified by the processing directive on the data specified by the data access request. The processing node transmits, to the requesting node, results of the data processing operations performed on the data by the processing node on behalf of the requesting node.

18 Claims, 7 Drawing Sheets

U.S. PATENT DOCUMENTS

| | | |
|---|---|---|
| 2003/0074142 A1 | 4/2003 | Steeg |
| 2004/0015494 A1 | 1/2004 | Basso et al. |
| 2004/0098373 A1 | 5/2004 | Bayliss et al. |
| 2005/0060462 A1 | 3/2005 | Ota |
| 2005/0182834 A1 | 8/2005 | Black |
| 2006/0059196 A1 | 3/2006 | Sato et al. |
| 2006/0292292 A1 | 12/2006 | Brightman et al. |
| 2007/0016589 A1 | 1/2007 | Hara et al. |
| 2008/0126739 A1 | 5/2008 | Archer et al. |
| 2008/0148355 A1 | 6/2008 | Archer et al. |
| 2008/0313376 A1 | 12/2008 | Archer et al. |
| 2008/0313661 A1 | 12/2008 | Blocksome et al. |
| 2009/0089328 A1 | 4/2009 | Miller et al. |
| 2009/0113308 A1 | 4/2009 | Almasi et al. |
| 2009/0138892 A1 | 5/2009 | Almasi et al. |

OTHER PUBLICATIONS

Bershad et al. SPIN—An Extensible Microkernel for Application-Specific Operating System Services. Technical Report 94-03-03 (Feb. 28, 1994). pp. 1-16. [Retrieved from: http://www-spin.cs.washington.edu/papers/index.html on Nov. 23, 2009].

Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.

"Windows Native Processor Performance Control", Windows Platform Design Notes—Designing Hardware for the Microsoft Windows Family of Operating Systems, Nov. 12, 2002.

Office Action Dated Dec. 10, 2009 in U.S. Appl. No. 11/553,040.
Office Action Dated Oct. 3, 2008 in U.S. Appl. No. 11/531,846.
Final Office Action Dated Mar. 2, 2009 in U.S. Appl. No. 11/531,846.
Office Action Dated Jul. 31, 2009 in U.S. Appl. No. 11/531,846.
Office Action Dated Apr. 29, 2009 in U.S. Appl. No. 11/764,282.
Final Office Action Dated Dec. 8, 2009 in U.S. Appl. No. 11/764,282.
Notice of Allowance Dated Oct. 13, 2009 in U.S. Appl. No. 11/837,015.

Chan, Ernie et al. "Collective Communication on Architectures that Support Simultaneous Communication over Multiple Links", PPoPP'06, Mar. 29-31, 2006, New York, New York, USA, pp. 2-11.

Mao, Weizhen et al. "One-To-All Personalized Communication in Torus Networks", Proceedings of the $25^{th}$ IASTED International Multi-Conference: parallel and distributed computing networks, Innsbruck, Austria, 2007, pp. 291-296.

Almasi, George et al. "Optimization of MPI Collective Communication on BlueGene/L Systems", ICS'05, Jun. 20-22, 2005, Boston, MA, USA, 2005, pp. 253-262.

Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.

Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.

* cited by examiner

PROCESSING DATA ACCESS REQUESTS AMONG A PLURALITY OF COMPUTE NODES

BACKGROUND OF THE INVENTION

1. Field of the Invention

The field of the invention is data processing, or, more specifically, methods, apparatus, and products for processing data access requests among a plurality of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances.

Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

Such data communications networks are capable of connecting a large number of compute nodes to process parallel algorithms. While processing the parallel algorithm, individual compute nodes may need to reserve exclusive access to certain segments of data to ensure the data's integrity. Data or processing errors would often occur if two compute nodes attempted to alter the same data segment at approximately the same time. The first compute node to access the data would store a temporary copy of the data in the node's computer memory and proceed to alter the temporary copy. If the first compute node did not reserve exclusive access to the data segment, a second compute node may attempt to access the data segment before the first compute node could store the altered version back in the original location of the data segment. The second compute node would therefore perform processing on stale data.

The traditional mechanism to maintain data integrity when a compute node processes shared data is for the compute node to obtain an exclusive lock or 'semaphore' that reserves a node's right to exclusively access the shared data. Other compute nodes attempting to process that same shared data must first have the node currently processing the data release its lock on the data. Typically, the nodes attempting to process the data send the node currently processing the data an unlock request. When the compute node that locked the data completes its processing tasks, the compute node unlocks the data and notifies one or more of the other nodes requesting access to the data that the data is available. The drawback to this current approach, however, is that in systems with a large number of compute nodes, the node having exclusive access to data may be bombarded with so many unlock requests that the compute node's ability to complete its processing tasks on the data is diminished. Moreover, the nodes sending the unlock request often remain idle until the node having exclusive data access releases the lock. In such a manner, the system does not efficiently utilize processing resources.

SUMMARY OF THE INVENTION

Methods, apparatus, and products are disclosed for processing data access requests among a plurality of compute nodes. At least one of the compute nodes operates as a processing node, and at least one of the compute nodes operates as a requesting node. Processing data access requests among a plurality of compute nodes includes: receiving, by the processing node from the requesting node, a data access request to access data currently being processed by the processing node; receiving, by the processing node from the requesting node, a processing directive, the processing directive specifying data processing operations to be performed on the data specified by the data access request; performing, by the processing node on behalf of the requesting node, the data processing operations specified by the processing directive on the data specified by the data access request; and transmitting, by the processing node to the requesting node, results of the data processing operations performed on the data by the processing node on behalf of the requesting node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
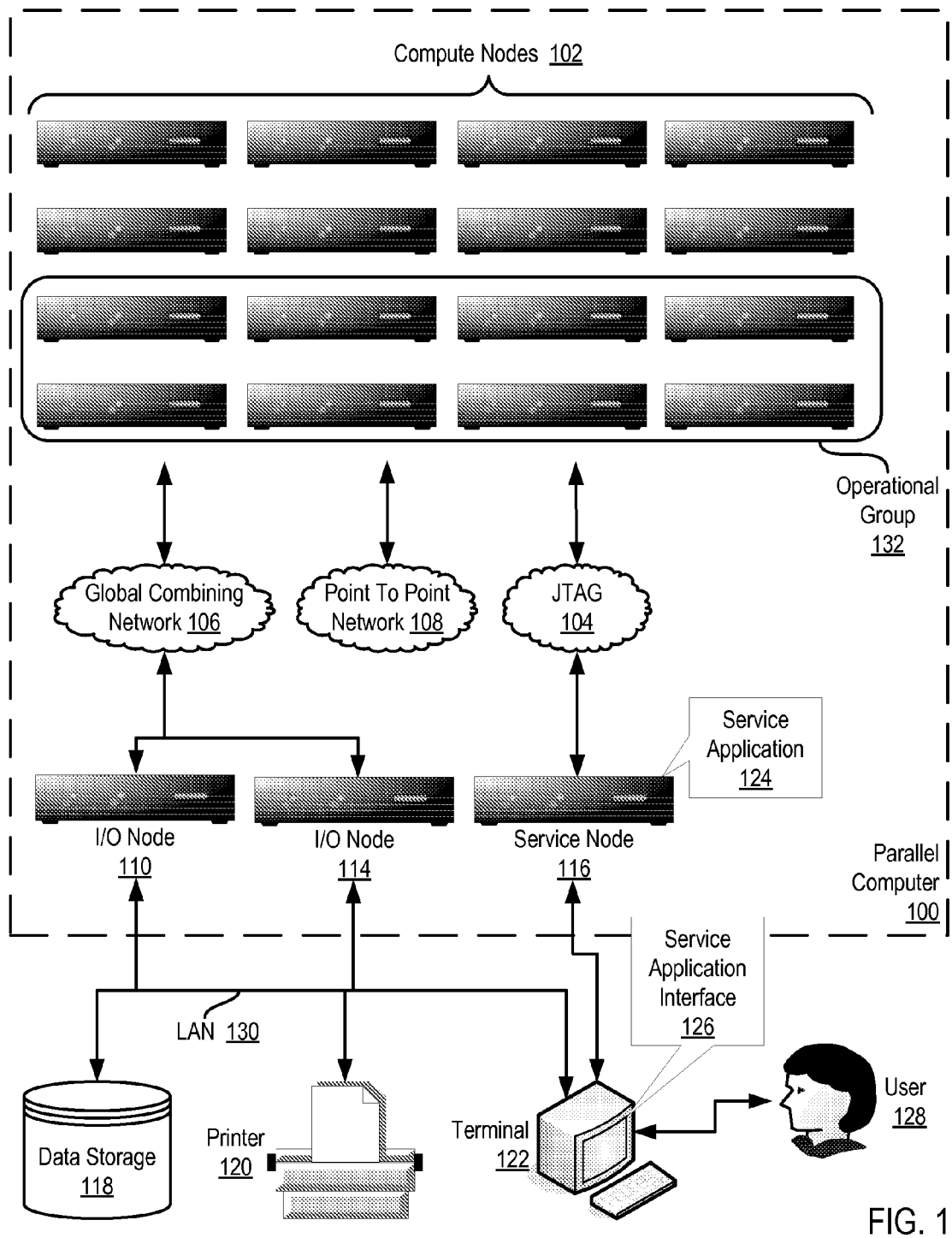
FIG. 1 illustrates an exemplary parallel computer for processing data access requests among a plurality of compute nodes according to embodiments of the present invention.

Exemplary methods, apparatus, and computer program products for processing data access requests among a plurality of compute nodes according to embodiments of the present invention are described with reference to the accompanying drawings, beginning with FIG. 1. FIG. 1 illustrates an exemplary parallel computer for processing data access requests among a plurality of compute nodes in the parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) for executing an application that processes application data.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*n elements of a given data type, where n is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) in FIG. 1 includes computer program instructions for processing data access requests among a plurality of compute nodes (102) according to embodiments of the present invention. At least one of the compute nodes (102) operates as a processing node, and at least one of the compute nodes (102) operates as a requesting node. A 'processing node' refers to a compute node having exclusive access to certain shared data. That is, a processing node has 'locked' the shared data so that only the processing node may access the data until the processing node 'unlocks' the data. A processing node unlocks the data when it relinquishes its exclusive access rights. A 'requesting node' refers to a compute node that requests access to the shared data currently locked by another compute node. A data access request is a request used by the requesting node to request access to shared data currently locked by another compute node. Thus, the data access request is effectively an unlock request.

The parallel computer (100) of FIG. 1 operates generally for processing data access requests among a plurality of compute nodes (102) according to embodiments of the present invention as follows: The processing node receives, from the requesting node, a data access request to access data currently being processed by the processing node. The processing node receives, from the requesting node, a processing directive. The processing directive specifies data processing operations to be performed on the data specified by the data access request. The processing node performs, on behalf of the requesting node, the data processing operations specified by the processing directive on the data specified by the data access request. The processing node transmits, to the requesting node, results of the data processing operations performed on the data by the processing node on behalf of the requesting node.

As mentioned above, a data processing request is a request used by the requesting node to request access to shared data currently locked by a processing node. The data processing request, however, is typically more than just a request for access to the data. The data processing request also implies a request for the processing node to send the locked data to the requesting node because the reason that the data is typically locked is that the processing node has the most recent version of the data stored in the processing node's computer memory.

A processing directive specifies the data processing operations that a requesting node seeks to perform on a particular set of data. The processing operations may include mathematical operations, data aggregation operations, data communications operations, data mining operations, and so on. By sending a processing directive in addition to a data access request, the requesting node allows the processing node to process the data on the requesting node's behalf using the processing operations specified in the processing directive, rather than sending the data to the requesting node for processing. Allowing the processing node to process the data on the requesting node's behalf using the processing operations specified in the processing directive is often a more efficient use of computing resources than sending the data to the requesting node for processing. For example, the data may be extremely large in size and the processing specified in the processing directive may consume only minimal processing resources. Rather than transferring the large amount of data through the network to the requesting node, allowing the processing node to process the data on the requesting node's behalf may be more efficient. Also, consider that the processing node has a lot of additional processing to perform on the data when the processing node receives the data access request and the processing directive from the requesting node. If the processing directive specifies minimally intensive processing operations, then the processing node may perform the processing operations on the requesting node's behalf before continuing with the processing node's additional processing. In such a manner, the requesting node does not have to wait until the processing node finishes all of its additional processing before obtaining the results that the requesting node seeks.

The arrangement of nodes, networks, and I/O devices making up the exemplary system illustrated in FIG. 1 are for explanation only, not for limitation of the present invention. Data processing systems capable of processing data access requests among a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Processing data access requests among a plurality of compute nodes according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of processing data access requests among a plurality of compute nodes according to embodiments of the present invention. The compute node (152) of FIG. 2 includes one or more processing cores (164) as well as computer memory (156) implemented, for example, as random access memory ('RAM'). The processing cores (164) are connected to computer memory (156) through a high-speed memory bus (154) and through a bus adapter (194) and an extension bus (168) to other components of the compute node (152).

Figure 2:
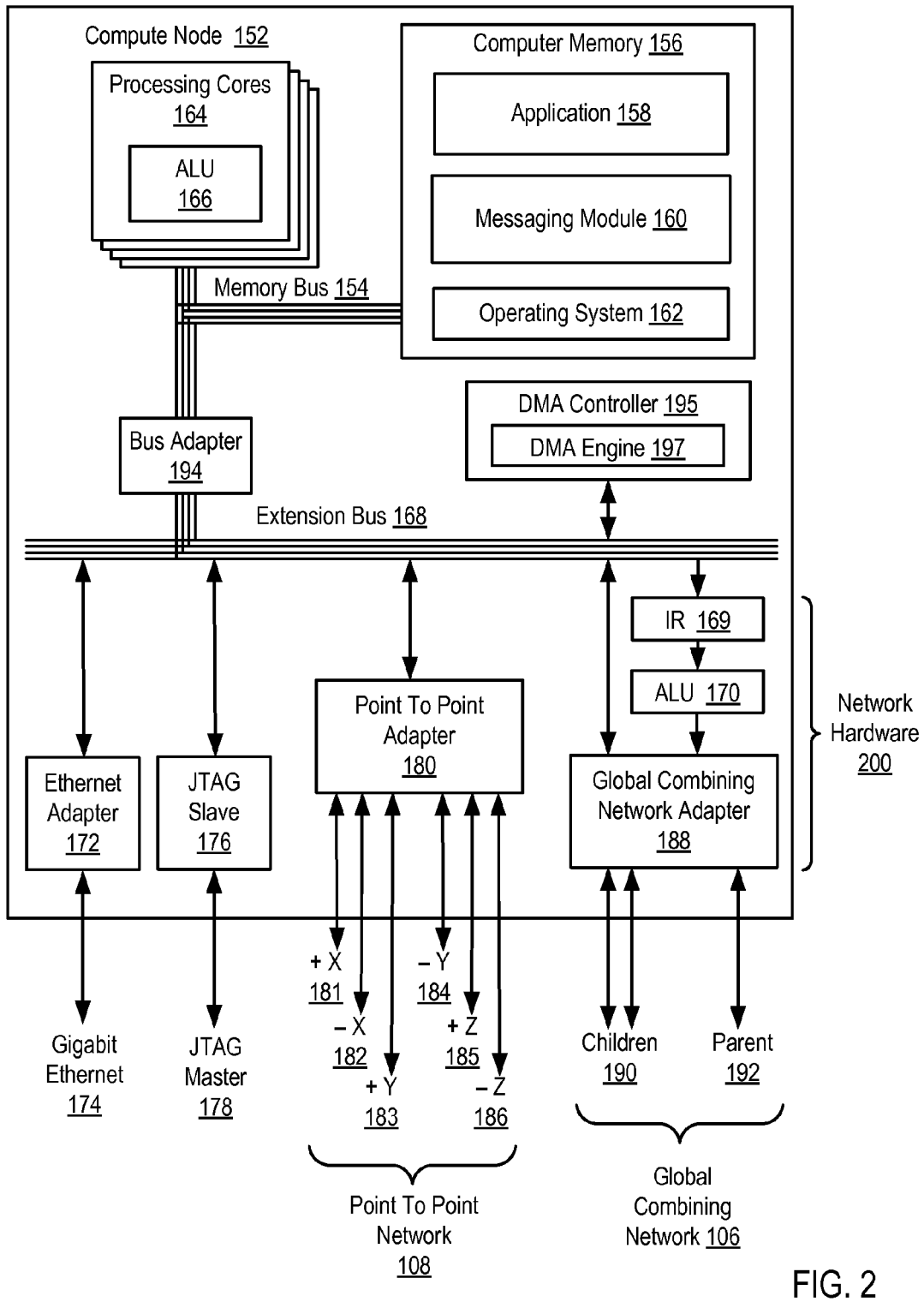
FIG. 2 sets forth a block diagram of an exemplary compute node useful in a parallel computer capable of processing data access requests among a plurality of compute nodes according to embodiments of the present invention.

Stored in computer memory (156) of FIG. 2 is an application (158), a module of computer program instructions that carries out parallel, user-level data processing using parallel algorithms. The application (158) includes computer program instructions capable of processing data access requests among a plurality of compute nodes according to embodiments of the present invention. Compute node (152) is included in the plurality of compute nodes and operates as a processing node. At least one of the other compute nodes operates as a requesting node. The application (158) includes computer program instructions capable of processing data access requests among a plurality of compute nodes according to embodiments of the present invention by: receiving, from the requesting node, a data access request to access data currently being processed by the processing node; receiving, from the requesting node, a processing directive, the processing directive specifying data processing operations to be performed on the data specified by the data access request; performing, on behalf of the requesting node, the data processing operations specified by the processing directive on the data specified by the data access request; and transmitting, to the requesting node, results of the data processing operations performed on the data by the processing node on behalf of the requesting node. Although processing data access requests among a plurality of compute nodes according to embodiments of the present invention is described above as carried out by the application (158), readers will note that processing data access requests among a plurality of compute nodes according to embodiments of the present invention may also be carried out by a messaging module or directly in the operating system, depending on the particular implementation.

Also stored in computer memory (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in computer memory (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for processing data access requests among a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in processing data access requests among a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
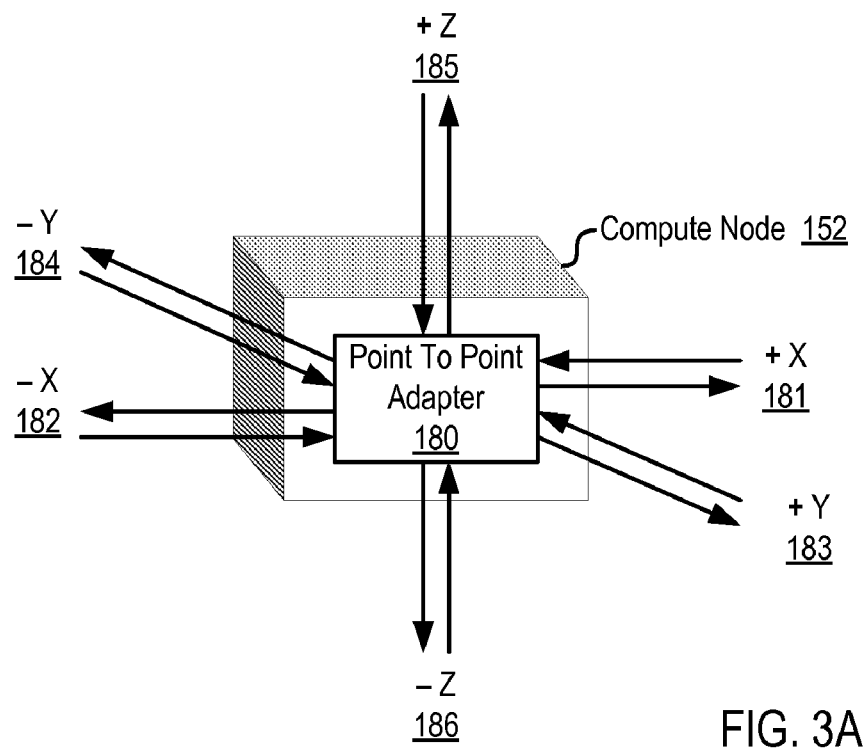
FIG. 3A illustrates an exemplary Point To Point Adapter useful in a parallel computer capable of processing data access requests among a plurality of compute nodes according to embodiments of the present invention.

For further explanation, FIG. 3A illustrates an exemplary Point To Point Adapter (180) useful in a parallel computer capable of processing data access requests among a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
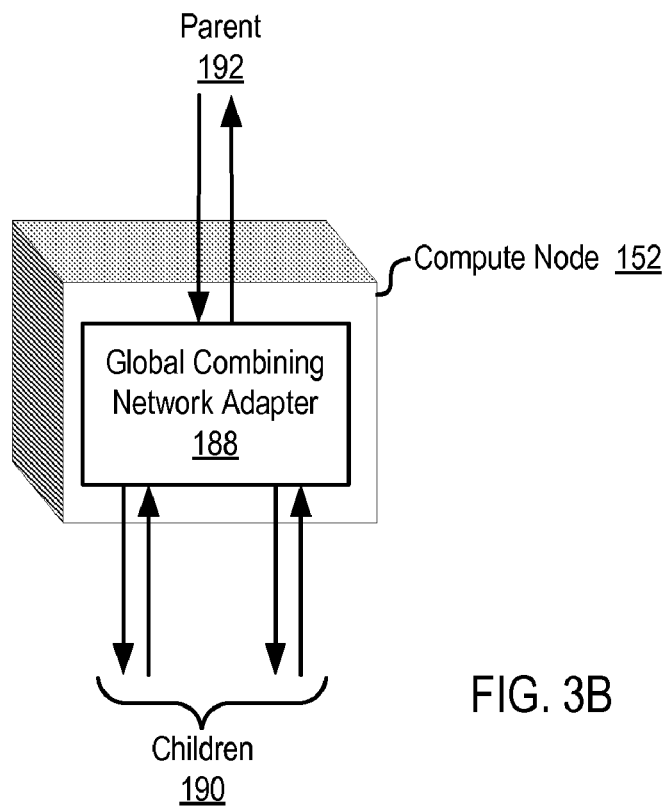
FIG. 3B illustrates an exemplary Global Combining Network Adapter useful in a parallel computer capable of processing data access requests among a plurality of compute nodes according to embodiments of the present invention.

For further explanation, FIG. 3B illustrates an exemplary Global Combining Network Adapter (188) useful in a parallel computer capable of processing data access requests among a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
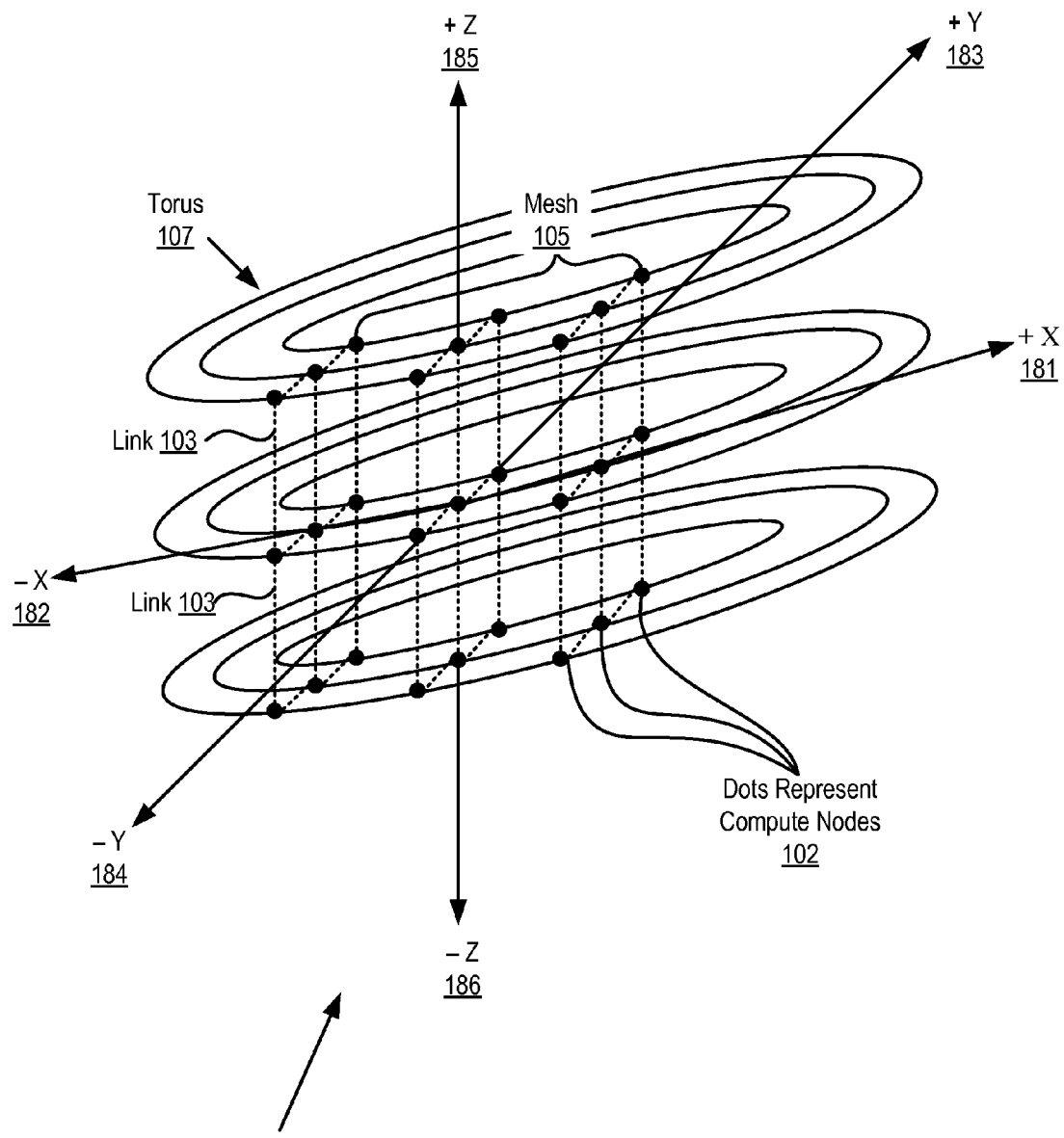
FIG. 4 sets forth a line drawing illustrating an exemplary data communications network optimized for point to point operations useful in a parallel computer capable of processing data access requests among a plurality of compute nodes according to embodiments of the present invention.

For further explanation, FIG. 4 sets forth a line drawing illustrating an exemplary data communications network (108) optimized for point to point operations useful in a parallel computer capable of processing data access requests among a plurality of compute nodes in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in processing data access requests among a plurality of compute nodes in accordance with embodiments of the present invention may contain only a few compute nodes or may contain thousands of compute nodes.

Figure 5:
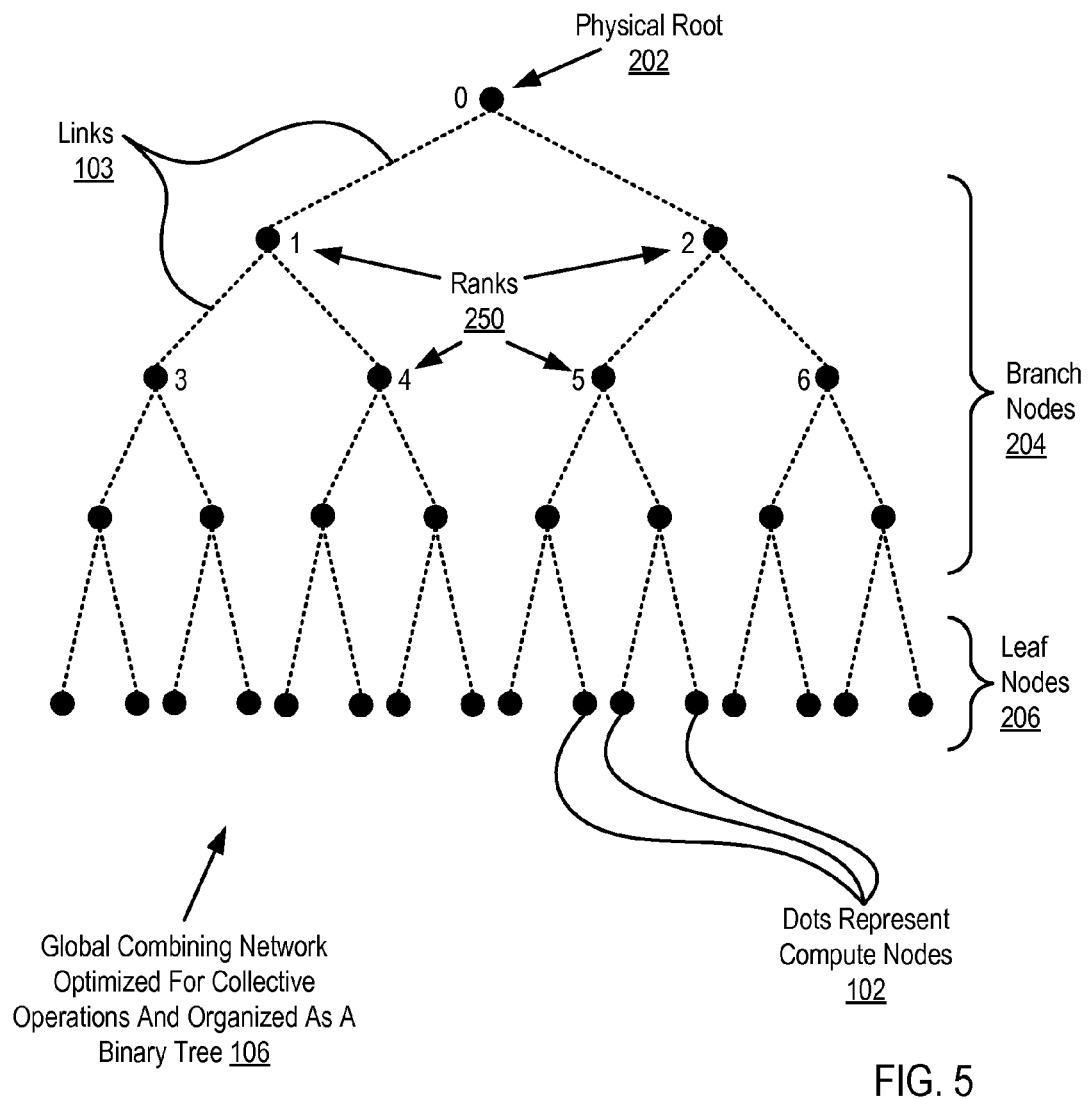
FIG. 5 sets forth a line drawing illustrating an exemplary data communications network optimized for collective operations useful in a parallel computer capable of processing data access requests among a plurality of compute nodes according to embodiments of the present invention.

For further explanation, FIG. 5 sets forth a line drawing illustrating an exemplary data communications network (106) optimized for collective operations useful in a parallel computer capable of processing data access requests among a plurality of compute nodes in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for processing data access requests among a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
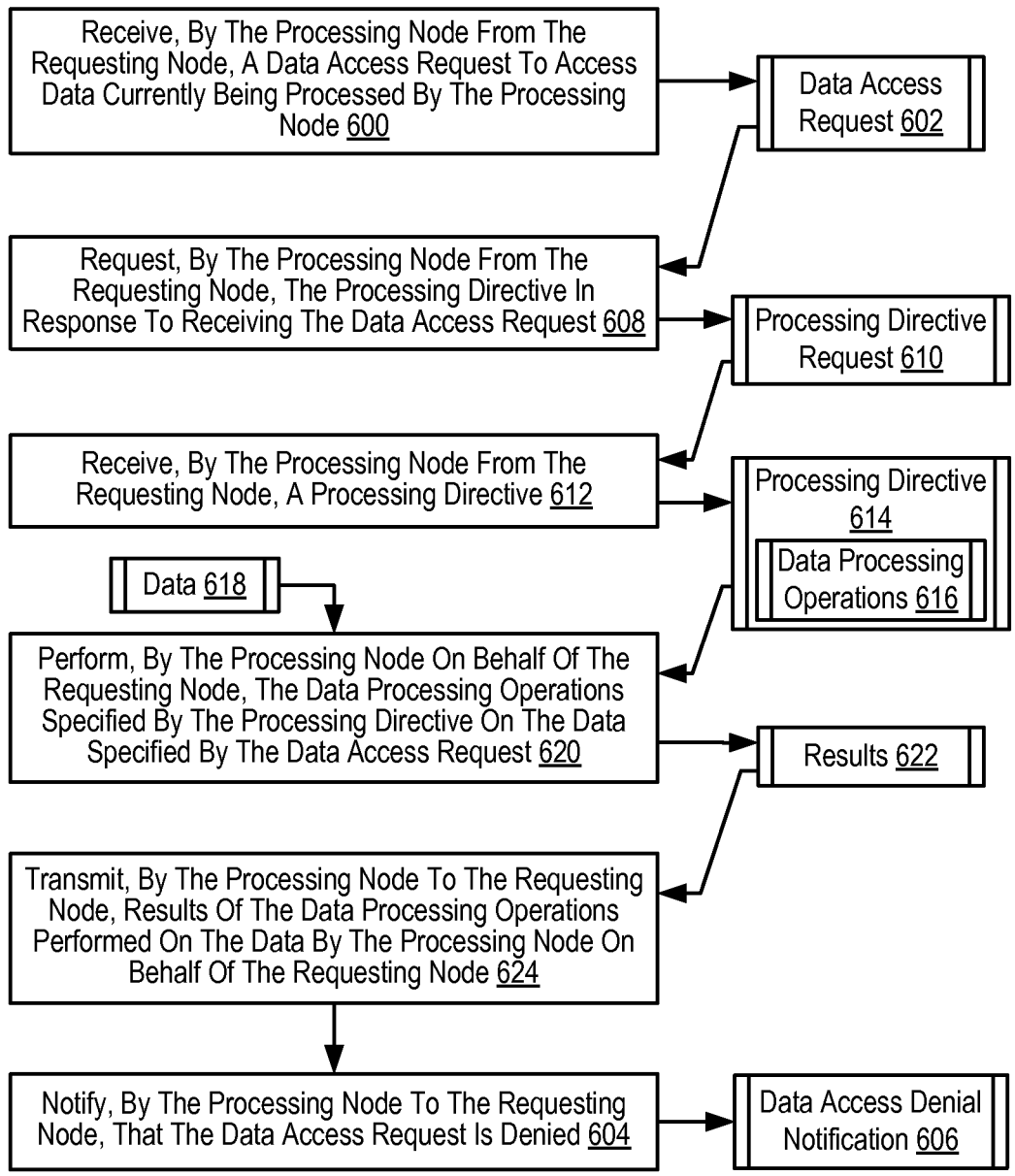
FIG. 6 sets forth a flow chart illustrating an exemplary method for processing data access requests among a plurality of compute nodes according to embodiments the present invention.

For further explanation, FIG. 6 sets forth a flow chart illustrating an exemplary method for processing data access requests among a plurality of compute nodes according to embodiments the present invention. The plurality of compute nodes connected together for data communications using a plurality of data communications networks. At least one of the data communications networks is optimized for point to point operations, and at least one of the data communications networks is optimized for collective operations.

In the example of FIG. 6, at least one of the compute nodes operates as a processing node, and at least one of the compute nodes operates as a requesting node. As mentioned above, a 'processing node' refers to a compute node having exclusive access to certain shared data. The processing node is said to have 'locked' the shared data so that only the processing node may access the data until the processing node 'unlocks' the data. A 'requesting node' refers to a compute node that requests access to the shared data currently locked by another compute node.

The processing node described with reference to FIG. 6 is currently processing data (618) and has exclusive rights to access the data (618) while processing the data (618). In such a manner, the processing node has locked the data (618). The exclusive access rights granted to the processing node may be implemented using a semaphore or other data structure specifying that the processing node has exclusive access to certain data until a particular condition is satisfied such as, for example, the processing node releases the data or a particular time period expires. Readers will note that while processing the data, the processing node typically retains the most up to date version of the data in the processing node's computer memory. Thus, when other compute nodes request access to the data currently locked by the processing node, the other compute nodes must send a request to the processing node requesting access to the data.

The method of FIG. 6 includes receiving (600), by the processing node from the requesting node, a data access request (602) to access data currently being processed exclusively by the processing node. The data access request (602) of FIG. 6 represents a request used by the requesting node to request access to shared data currently locked by another compute node. Thus, the data access request is effectively a request that the processing node release its lock on the data (618). The processing node may receive (600) a data access request (602) from the requesting node according to the method of FIG. 6 using a point to point messaging passing operation such as, for example, an 'MPI_RECV' operation as specified in the MPI family of specifications.

The method of FIG. 6 includes requesting (608), by the processing node from the requesting node, a processing directive (614) in response to receiving the data access request (602). The processing node may request (608) a processing directive (614) from the requesting node in response to receiving the data access request (602) according to the method of FIG. 6 by sending a processing directive request (610) to the requesting node. The processing directive request (610) of FIG. 6 represents a request that the requesting node inform the processing node of the data processing operations that the requesting node seeks to perform on the data (618). In such a manner, the processing node may perform those data processing operations on behalf of the requesting node and provide the requesting node with the results. Processing the data on the requesting node's behalf is useful when performing the processing operations specified by the requesting node would consume less overall resources than transferring the data through the network to the requesting node for processing. Also, processing the data on the requesting node's behalf is useful when the processing node has a lot of processing remaining and the processing that the requesting node seeks to perform is minimal. The processing node may pause its own processing operations temporarily to perform the processing operations on behalf of the requesting node so that the requesting node need not wait for the processing node to finish its own processing operations before obtaining the results that the requesting node seeks to calculate.

The method of FIG. 6 then includes receiving (612), by the processing node from the requesting node, a processing directive (614). The processing directive (614) of FIG. 6 specifies data processing operations (616) to be performed on the data (618) specified by the data access request (602). The processing operations (616) may include mathematical operations, data aggregation operations, data communications operations, data mining operations, and so on. By sending a processing directive (614) in addition to a data access request (602), the requesting node allows the processing node to process the data (618) on the requesting node's behalf using the processing operations (616) specified in the processing directive, rather than sending the data (618) to the requesting node for processing. The processing node may receive (612) a processing directive (614) from the requesting node according to the method of FIG. 6 using a point to point messaging operation such as, for example, the 'MPI_RECV' operation. In the description above, the processing node requests (608) the processing directive in response to receiving the data access request (602) from the requesting node. Readers will note, however, that in other embodiments, the processing node may receive the processing directive (614) as part of the data access request (602).

The method of FIG. 6 includes performing (620), by the processing node on behalf of the requesting node, the data processing operations (616) specified by the processing directive (614) on the data (618) specified by the data access request (602). The processing node may perform (620) the data processing operations (616) on behalf of the requesting node according to the method of FIG. 6 by identifying the specific data processing operations (616) to perform and the order of their performance from the processing directive (614), scheduling the data processing operations (616) for execution on the processing node's processors, and storing the results (622) of the data processing operations (616) into some temporary storage space on the processing node.

The method of FIG. 6 also includes transmitting (624), by the processing node to the requesting node, results (622) of the data processing operations performed on the data (618) by the processing node on behalf of the requesting node. The processing node may transmit (624) the results (622) of the data processing operations according to the method of FIG. 6 using a point to point message passing operations such as, for example, the 'MPI_SEND' operation.

The method of FIG. 6 includes notifying (604), by the processing node to the requesting node, that the data access request (602) is denied. The processing node may deny data access request (602) because the processing node is configured to process the data according to the processing directive (614) rather than send the latest version of the data (618) from the processing node's computer memory to the requesting node. The processing node may notify (604) the requesting node that the data access request is denied according to the method of FIG. 6 by sending the requesting node a data access denial notification (606). The processing node may send the requesting node a data access denial notification (606) using a point to point messaging operation such as, for example, the 'MPI_SEND' operation specified in the MPI family of specifications.

Figure 7:
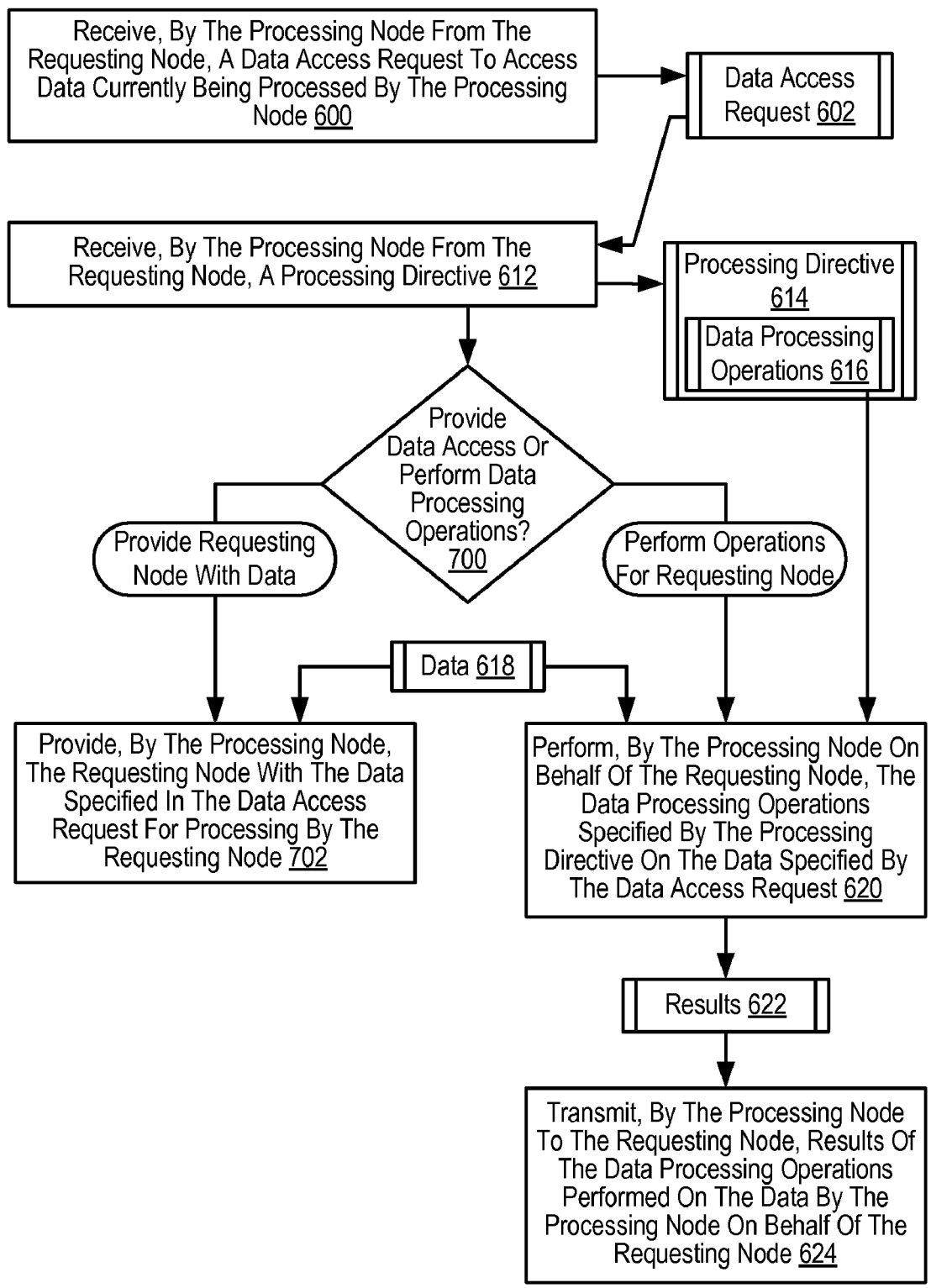
FIG. 7 sets forth a flow chart illustrating a further exemplary method for processing data access requests among a plurality of compute nodes according to embodiments the present invention.

In the description of FIG. 6, the processing node is configured to perform data processing operations on the requesting node's behalf to avoid sending the data locked by the processing node through the network to the requesting node. In some embodiments, however, the processing node may decide whether to release the lock on the data so that the requesting node can process the data or simply perform the requesting node's data processing operations on the requesting node's behalf based on which of the two will consume less computing resources. For further explanation, FIG. 7 sets forth a flow chart illustrating a further exemplary method for processing data access requests among a plurality of compute nodes according to embodiments the present invention. The plurality of compute nodes connected together for data communications using a plurality of data communications networks. At least one of the data communications networks is optimized for point to point operations, and at least one of the data communications networks is optimized for collective operations. In the example of FIG. 7, at least one of the compute nodes operates as a processing node, and at least one of the compute nodes operates as a requesting node.

The method of FIG. 7 is similar to the method of FIG. 6. That is, the method of FIG. 7 includes: receiving (600), by the processing node from the requesting node, a data access request (602) to access data (618) currently being processed by the processing node; receiving (612), by the processing node from the requesting node, a processing directive (614), the processing directive (614) specifying data processing operations (616) to be performed on the data (618) specified by the data access request (602); performing (620), by the processing node on behalf of the requesting node, the data processing operations (616) specified by the processing directive (614) on the data (618) specified by the data access request (602); and transmitting (624), by the processing node to the requesting node, results (622) of the data processing operations (616) performed on the data (618) by the processing node on behalf of the requesting node.

The method of FIG. 7 includes determining (700), by the processing node, which of providing the requesting node with the data (618) specified in the data access request (602) or performing the data processing operations (616) on the data on behalf of the requesting node consumes less computing resources of the processing node. The processing node may determine (700) which of providing the requesting node with the data (618) or performing the data processing operations (616) on the data on behalf of the requesting node consumes less computing resources of the processing node according to the method of FIG. 7 by estimating processing time required to release the lock on the data and provide the data to the requesting node, estimating processing time required to perform the data processing operations (616) on the data (618) on behalf of the requesting node, and comparing the two estimated processing times. If the estimated processing time required to release the lock on the data and provide the data to the requesting node is less than the estimated processing time required to perform the data processing operations (616) on the data (618) on behalf of the requesting node, then providing the requesting node with the data (618) specified in the data access request (602) may consume less computing resources of the processing node. If the estimated processing time required to release the lock on the data and provide the data to the requesting node is more than the estimated processing time required to perform the data processing operations (616) on the data (618) on behalf of the requesting node, then performing the data processing operations (616) on the data on behalf of the requesting node may consume less computing resources of the processing node.

Readers will note that in the example of FIG. 7, performing (620) the data processing operations (616) specified by the processing directive (614) on the data specified by the data access request (602) is carried out if performing the data processing operations (616) on the data on behalf of the requesting node consumes less computing resources of the processing node than providing the requesting node with the data specified in the data access request (602).

The method of FIG. 7 also includes providing (702), by the processing node, the requesting node with the data (618) specified in the data access request (602) for processing by the requesting node if performing the data processing operations (616) on the data on behalf of the requesting node does not consume less computing resources of the processing node than providing the requesting node with the data specified in the data access request (602). The processing node may provide (702) the requesting node with the data (618) specified in the data access request (602) for processing by the requesting node according to the method of FIG. 7 using a point to point message passing operations such as, for example, the 'MPI_SEND' operation.

Readers will note that the method of FIG. 7 allows a processing node to take advantage of traditional methods of releasing the lock for the requesting node to processing the data and exemplary aspects of the present invention that allow the processing node to perform the data processing operations on behalf of the processing node. When providing the data to the requesting node is more computationally efficient than processing the data on the requesting node's behalf, then the processing node releases the lock on the data and transfers the data to the requesting node for processing. When the performing the processing operations on the data is more computationally efficient than providing the data to the requesting node, then the processing node retains the lock on the data, performs the processing requested by the requesting node, and returns the results of the processing to the requesting node.

Exemplary embodiments of the present invention are described largely in the context of a fully functional parallel computer system for processing data access requests among a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing data access requests among a plurality of compute nodes, at least one of the compute nodes operating as a processing node, and at least one of the compute nodes operating as a requesting node, the method comprising:

receiving, by the processing node from the requesting node, a data access request to access data currently being processed by the processing node;

receiving, by the processing node from the requesting node, a processing directive, the processing directive specifying one or more of a plurality of available and disparate data processing operations to be performed on the data specified by the data access request;

performing, by the processing node on behalf of the requesting node, the data processing operations specified by the processing directive on the data specified by the data access request; and transmitting, by the processing node to the requesting node, results of the data processing operations performed on the data by the processing node on behalf of the requesting node.

2. The method of claim 1 wherein receiving, by the processing node from the requesting node, a processing directive further comprises receiving the processing directive as part of the data access request.

3. The method of claim 1 further comprising requesting, by the processing node from the requesting node, the processing directive in response to receiving the data access request.

4. The method of claim 1 further comprising notifying, by the processing node to the requesting node, that the data access request is denied.

5. The method of claim 1 wherein:

the method further comprises determining, by the processing node, which of providing the requesting node with the data specified in the data access request or performing the data processing operations on the data on behalf of the requesting node consumes less computing resources of the processing node; and performing, by the processing node on behalf of the requesting node, the data processing operations specified by the processing directive on the data specified by the data access request further comprises performing the data processing operations specified by the processing directive on the data specified by the data access request if performing the data processing operations on the data on behalf of the requesting node consumes less computing resources of the processing node than providing the requesting node with the data specified in the data access request.

6. The method of claim 1 wherein processing data access requests among a plurality of compute nodes further comprises processing data access requests among a plurality of compute nodes in a parallel computer, the plurality of compute nodes connected together using a plurality of data communications networks, at least one of the data communications networks optimized for point to point operations, and at least one of the data communications networks optimized for collective operations.

7. A parallel computer for processing data access requests among a plurality of compute nodes, at least one of the compute nodes operating as a processing node, and at least one of the compute nodes operating as a requesting node, the parallel computer comprising one or more computer processors and computer memory operatively coupled to the computer processors, the computer memory having disposed within it computer program instructions capable of:

receiving, by the processing node from the requesting node, a data access request to access data currently being processed by the processing node;

receiving, by the processing node from the requesting node, a processing directive, the processing directive specifying one or more of a plurality of available and disparate data processing operations to be performed on the data specified by the data access request;

performing, by the processing node on behalf of the requesting node, the data processing operations specified by the processing directive on the data specified by the data access request; and transmitting, by the processing node to the requesting node, results of the data processing operations performed on the data by the processing node on behalf of the requesting node.

8. The parallel computer of claim 7 wherein receiving, by the processing node from the requesting node, a processing directive further comprises receiving the processing directive as part of the data access request.

9. The parallel computer of claim 7 wherein the computer memory has disposed within it computer program instructions capable of requesting, by the processing node from the requesting node, the processing directive in response to receiving the data access request.

10. The parallel computer of claim 7 wherein the computer memory has disposed within it computer program instructions capable of notifying, by the processing node to the requesting node, that the data access request is denied.

11. The parallel computer of claim 7 wherein:

the computer memory has disposed within it computer program instructions capable of determining, by the processing node, which of providing the requesting node with the data specified in the data access request or performing the data processing operations on the data on behalf of the requesting node consumes less computing resources of the processing node; and performing, by the processing node on behalf of the requesting node, the data processing operations specified by the processing directive on the data specified by the data access request further comprises performing the data processing operations specified by the processing directive on the data specified by the data access request if performing the data processing operations on the data on behalf of the requesting node consumes less computing resources of the processing node than providing the requesting node with the data specified in the data access request.

12. The parallel computer of claim 7 wherein the plurality of compute nodes are connected together using a plurality of data communications networks, at least one of the data communications networks optimized for point to point operations, and at least one of the data communications networks optimized for collective operations.

13. A computer program product for processing data access requests among a plurality of compute nodes, at least one of the compute nodes operating as a processing node, and at least one of the compute nodes operating as a requesting node, the computer program product disposed upon a computer readable recordable medium, the computer program product comprising computer program instructions capable of:

receiving, by the processing node from the requesting node, a data access request to access data currently being processed by the processing node;

receiving, by the processing node from the requesting node, a processing directive, the processing directive specifying one or more of a plurality of available and disparate data processing operations to be performed on the data specified by the data access request;

performing, by the processing node on behalf of the requesting node, the data processing operations specified by the processing directive on the data specified by the data access request; and transmitting, by the processing node to the requesting node, results of the data processing operations performed on the data by the processing node on behalf of the requesting node.

14. The computer program product of claim 13 wherein receiving, by the processing node from the requesting node, a processing directive further comprises receiving the processing directive as part of the data access request.

15. The computer program product of claim 13 further comprising computer program instructions capable of requesting, by the processing node from the requesting node, the processing directive in response to receiving the data access request.

16. The computer program product of claim 13 further comprising computer program instructions capable of notifying, by the processing node to the requesting node, that the data access request is denied.

17. The computer program product of claim 13 wherein:

the computer program product further comprises computer program instructions capable of determining, by the processing node, which of providing the requesting node with the data specified in the data access request or performing the data processing operations on the data on behalf of the requesting node consumes less computing resources of the processing node; and performing, by the processing node on behalf of the requesting node, the data processing operations specified by the processing directive on the data specified by the data access request further comprises performing the data processing operations specified by the processing directive on the data specified by the data access request if performing the data processing operations on the data on behalf of the requesting node consumes less computing resources of the processing node than providing the requesting node with the data specified in the data access request.

18. The computer program product of claim 13 wherein processing data access requests among a plurality of compute nodes further comprises processing data access requests among a plurality of compute nodes in a parallel computer, the plurality of compute nodes connected together using a plurality of data communications networks, at least one of the data communications networks optimized for point to point operations, and at least one of the data communications networks optimized for collective operations.

* * * * *